(12) United States Patent
Kikuchi et al.

(10) Patent No.: US 11,519,420 B2
(45) Date of Patent: Dec. 6, 2022

(54) ROTARY MACHINE SYSTEM

(71) Applicant: MITSUBISHI HEAVY INDUSTRIES COMPRESSOR CORPORATION, Tokyo (JP)

(72) Inventors: Masayoshi Kikuchi, Hiroshima (JP); Takuya Watanabe, Hiroshima (JP); Norikazu Kasaoka, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 145 days.

(21) Appl. No.: 17/181,609

(22) Filed: Feb. 22, 2021

(65) Prior Publication Data
US 2021/0262476 A1    Aug. 26, 2021

(30) Foreign Application Priority Data
Feb. 25, 2020    (JP) .............................. JP2020-029537

(51) Int. Cl.
*F04D 25/06*    (2006.01)
*F04D 29/056*    (2006.01)
(Continued)

(52) U.S. Cl.
CPC ............... *F04D 25/06* (2013.01); *F01M 1/16* (2013.01); *F04D 29/056* (2013.01);
(Continued)

(58) Field of Classification Search
CPC ...... F04D 25/028; F04D 25/06; F04D 29/056; F04D 29/057; F04D 29/059;
(Continued)

(56) References Cited

U.S. PATENT DOCUMENTS 3,853,433 A * 12/1974 Roberts ............... F04D 27/0246
184/6
2019/0120086 A1 * 4/2019 Watanabe ............. F01D 25/125

FOREIGN PATENT DOCUMENTS

EP    1333156 A1    8/2003
EP    3524814 A1    8/2019
(Continued)

OTHER PUBLICATIONS

Showa, Bearing Lubricator ("JP-63-34305_MachTrans_Google.pdf"),Mar. 1988 (Year: 1988).*

*Primary Examiner* — Kenneth J Hansen
(74) *Attorney, Agent, or Firm* — Osha Bergman Watanabe & Burton LLP

(57) ABSTRACT

A rotary machine system includes a rotary electric machine, a rotary machine, a first supply line and a second supply line through which the lubricating oil is supplied to the rotary machine bearing, a first discharge line and a second discharge line through which the lubricating oil is discharged downward from the rotary machine bearing, and a lower discharge line through which the lubricating oil discharged from the first discharge line and the second discharge line flows toward a discharge destination. The lower discharge line has a first connecting portion connected to a lower end of the first discharge line and a second connecting portion connected to a lower end of the second discharge line, and extends such that the lubricating oil heads for the discharge destination through the first connecting portion from the second connecting portion.

6 Claims, 2 Drawing Sheets

(51) Int. Cl.
    *F04D 29/063*    (2006.01)
    *F01M 1/16*      (2006.01)
    *H02K 7/08*      (2006.01)
    *H02K 7/116*     (2006.01)

(52) U.S. Cl.
    CPC ........... *F04D 29/063* (2013.01); *H02K 7/083* (2013.01); *H02K 7/116* (2013.01); *F16N 2210/14* (2013.01)

(58) Field of Classification Search
    CPC .... F04D 29/063; F04D 29/5806; F01D 25/18; F01D 25/20; F16N 7/385; F16N 29/02; F16N 2210/14; F01M 1/02; F01M 1/12; F01M 1/16; H02K 7/083; H02K 7/116
    USPC ................................................ 184/6.11, 6.16
    See application file for complete search history.

(56) References Cited

FOREIGN PATENT DOCUMENTS

| | | |
|---|---|---|
| JP | S63-034305 U | 3/1988 |
| JP | 2009074422 A | 4/2009 |

\* cited by examiner

ROTARY MACHINE SYSTEM

BACKGROUND OF THE INVENTION

Field of the Invention

The present disclosure relates to a rotary machine system.
Priority is claimed on Japanese Patent Application No. 2020-029537, filed on Feb. 25, 2020, the content of which is incorporated herein by reference.

Description of Related Art

A rotary machine system which is a combination of a rotary machine and an electric motor is known. For example, a configuration including a driving device, such as a motor (electric motor), and a compression device (rotary machine) driven by the driving device via a shaft body is disclosed in Japanese Unexamined Patent Application, First Publication No. 2009-74422. In the configuration, a lubricating oil is supplied to a bearing that rotatably supports a rotating body such as the shaft body. The lubricating oil used in the bearing is collected and circulated such that the lubricating oil can be supplied to the bearing again.

SUMMARY OF THE INVENTION

However, in the configuration disclosed in Japanese Unexamined Patent Application, First Publication No. 2009-74422, the motor, which is the electric motor, is disposed at a position far from a lubricating oil tank (oil tank) that collects the lubricating oil with respect to the compression device, which is the rotary machine. In such a configuration, when the pressure of the bearing of the electric motor increases, the lubricating oil leaks from the bearing of the electric motor in some cases. In order to solve this problem, negative pressure is applied to a bearing box by suctioning a gas from the bearing box with a suction device. However, since the suction device is provided, the cost of the system increases as a whole.

The present disclosure provides a rotary machine system that can suppress the occurrence of leakage of a lubricating oil in a bearing while suppressing a cost increase.

According to an aspect of the present disclosure, a rotary machine system is provided including a rotary electric machine that has a rotary electric rotor and has a rotary electric bearing rotatably supporting the rotary electric rotor, a rotary machine that has a rotary machine rotor that is configured to rotate with the rotary electric rotor and has a rotary machine bearing rotatably supporting the rotary machine rotor, a first supply line through which a lubricating oil is supplied to the rotary electric bearing, a second supply line through which the lubricating oil is supplied to the rotary machine bearing at a flow rate higher than that in the first supply line, a first discharge line through which the lubricating oil is discharged downward from the rotary electric bearing, a second discharge line through which the lubricating oil is discharged downward from the rotary machine bearing at a flow rate higher than that in the first discharge line, and a lower discharge line through which the lubricating oil discharged from the first discharge line and the second discharge line flows toward a discharge destination. The lower discharge line has a first connecting portion connected to a lower end of the first discharge line and a second connecting portion connected to a lower end of the second discharge line and extends such that the lubricating oil heads for the discharge destination through the first connecting portion from the second connecting portion.

In the rotary machine system of the present disclosure, it is possible to suppress the occurrence of leakage of the lubricating oil in the bearing of the rotary electric machine while suppressing a cost increase.

DETAILED DESCRIPTION OF THE INVENTION

Hereinafter, an embodiment of a rotary machine system 1 according to the present invention will be described with reference to the drawings. However, the present invention is not limited only to the embodiment.

(Configuration of Rotary Machine System)

Figure 1:
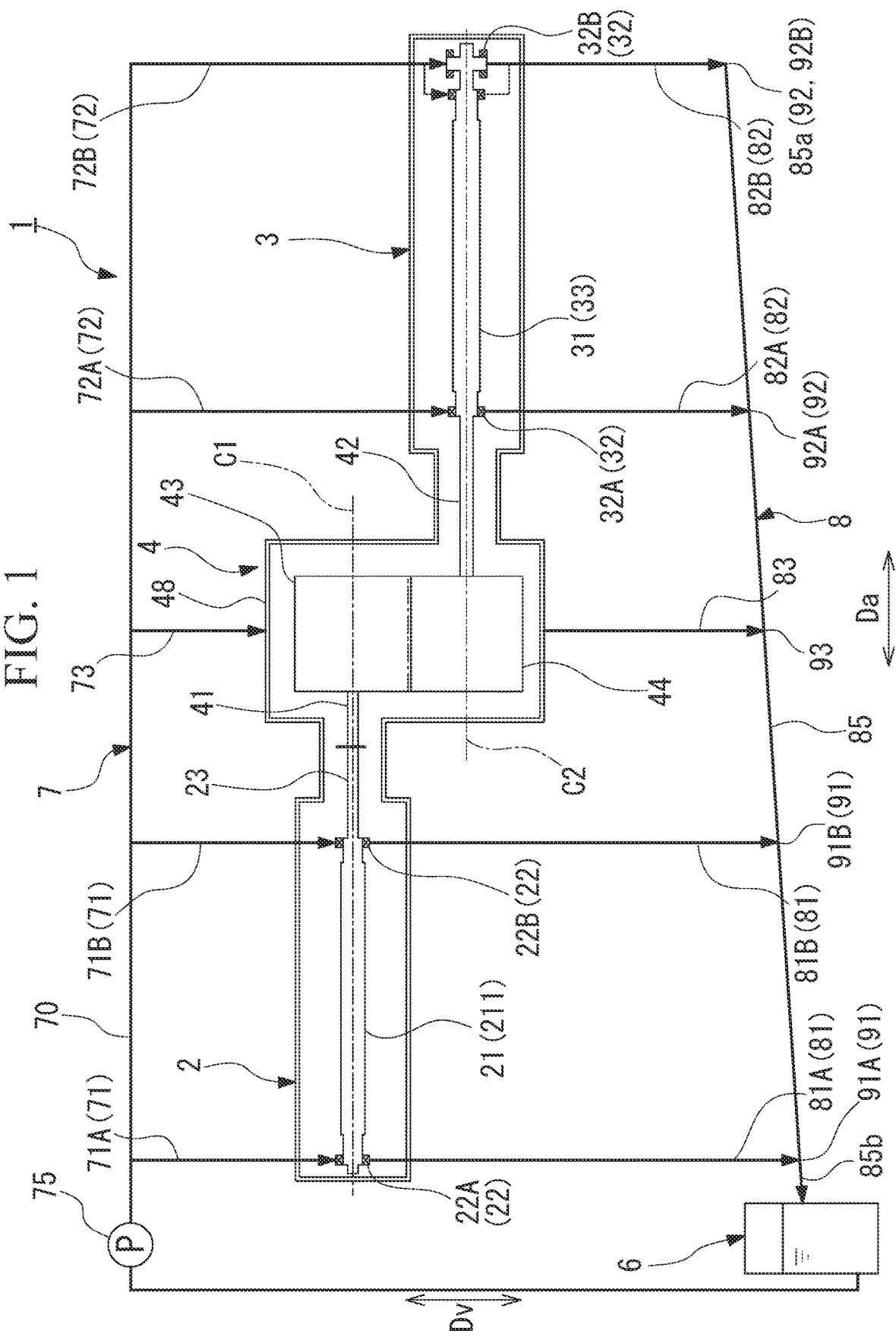
FIG. 1 is a schematic view illustrating the entire configuration of a rotary machine system according to the present embodiment.

As illustrated in FIG. 1, the rotary machine system 1 mainly includes an electric motor 2 which is a rotary electric machine, a compressor 3 which is a rotary machine, a transmission 4, an oil tank 6, a lubricating oil supply line 7, and a lubricating oil discharge line 8. Although the rotary machine system 1 of the present embodiment includes one compressor 3 and one transmission 4, the present invention is not limited to such an embodiment. The rotary machine system 1 may include a plurality of compressors 3 and a plurality of transmissions 4.

(Configuration of Electric Motor)

The electric motor 2 is connected to the compressor 3 via the transmission 4. The electric motor 2 is a so-called motor and drives the compressor 3. The electric motor 2 includes an electric motor main body 21 and an electric motor bearing 22.

The electric motor main body 21 includes an electric motor rotor (rotary electric rotor) 211 and a stator (not illustrated). A permanent magnet (not illustrated) is fixed to an outer peripheral surface of the electric motor rotor 211. The stator is disposed radially outside the electric motor rotor 211 and the permanent magnet. The electric motor rotor 211 is rotationally driven by an alternating magnetic field generated by the stator. The electric motor rotor 211 integrally has an output shaft 23 on the other end in an axial direction Da along a first axis C1. The output shaft 23 extends in the axial direction Da along the first axis C1. The output shaft 23 has a columnar shape about the first axis C1.

(Configuration of Electric Motor Bearing)

The electric motor bearing 22 supports the electric motor rotor 211 such that the electric motor rotor freely rotates about the first axis C1. The electric motor bearing 22 has a first electric motor bearing 22A and a second electric motor bearing 22B. The first electric motor bearing 22A is disposed at a position close to one end (first end) of the electric motor rotor 211 in the axial direction Da. The second electric motor bearing 22B is disposed at a position close to the other end (second end) of the electric motor rotor 211 in the axial direction Da. Each of the first electric motor bearing 22A and the second electric motor bearing 22B has a radial bearing.

(Configuration of Compressor)

The compressor 3 is disposed side by side with the electric motor 2 at an interval in the axial direction Da. As a rotor 33 rotates, the compressor 3 compresses a working fluid taken in from the outside, thereby generating a compressed fluid. Herein, the type and use of the compressed fluid generated by the compressor 3 are not limited. The rotation of the output shaft 23 is transmitted to the compressor 3 of the present embodiment via the transmission 4. The compressor 3 of the present embodiment is, for example, a multi-stage centrifugal compressor. The compressor 3 includes a compressor main body 31 which is a rotary machine main body and a compressor bearing 32 which is a rotary machine bearing.

The compressor main body 31 includes a rotor (rotary machine rotor) 33 and at least one impeller (not illustrated). The rotor 33 extends along a second axis C2. The rotor 33 has a columnar shape about the second axis C2. The second axis C2 is parallel to the first axis C1 and extends in the axial direction Da. The first axis C1 and the second axis C2 are disposed at positions shifted away from each other in a direction orthogonal to the axial direction Da. The plurality of impellers (not illustrated) are disposed at an interval in the axial direction Da on an outer peripheral surface of the rotor 33.

(Configuration of Compressor Bearing)

The compressor bearing 32 supports the rotor 33 of the compressor main body 31 such that the rotor freely rotates about the second axis C2. The compressor bearing 32 has a first compressor bearing 32A and a second compressor bearing 32B. The first compressor bearing 32A is disposed at a position close to one end (first end) of the rotor 33 in the axial direction Da. The second compressor bearing 32B is disposed at a position close to the other end (second end) of the rotor 33 in the axial direction Da. The first compressor bearing 32A has a radial bearing. The second compressor bearing 32B has a radial bearing and a thrust bearing.

(Configuration of Transmission)

The transmission 4 accelerates or decelerates the rotation of the electric motor 2 and transmits the rotation to the compressor 3 with a plurality of gears. The transmission 4 is disposed between the electric motor 2 and the compressor 3 in the axial direction Da. The transmission 4 of the present embodiment has a transmission input shaft 41 connected to the output shaft 23 and a transmission output shaft 42 connected to the rotor 33.

The transmission input shaft 41 extends along the first axis C1. The transmission input shaft 41 is rotated about the first axis C1 integrally with the output shaft 23. A gear 43 on an input side is integrally fixed to the transmission input shaft 41. The transmission output shaft 42 extends along the second axis C2. The transmission output shaft 42 is rotated about the second axis C2 integrally with the rotor 33. At a position shifted away from the transmission input shaft 41 in the direction orthogonal to the axial direction Da, the transmission output shaft 42 extends parallel to the transmission input shaft 41. A gear 44 on an output side is integrally fixed to the transmission output shaft 42.

The transmission 4 transmits the rotation of the transmission input shaft 41 rotating integrally with the output shaft 23 to the transmission output shaft 42 via the two gears 43 and 44. Accordingly, the rotor 33 rotates integrally with the transmission output shaft 42. In this manner, the transmission 4 accelerates or decelerates the rotation of the output shaft 23 and transmits the rotation to the rotor 33.

(Configuration of Oil Tank)

The oil tank 6 stores a lubricating oil to be used in the electric motor 2, the transmission 4, and the compressor 3. The oil tank 6 is a supply destination and also a discharge destination of the lubricating oil. The lubricating oil of the present embodiment lubricates the electric motor bearing 22 (the first electric motor bearing 22A and the second electric motor bearing 22B), the compressor bearing 32 (the first compressor bearing 32A and the second compressor bearing 32B), and the gears and a bearing (not illustrated), which are inside the transmission 4.

Although the oil tank 6 may be provided as part of the configuration of the rotary machine system 1, the oil tank may be provided on a side of a variety of facilities where the rotary machine system 1 is mounted. In other words, the oil tank 6 may be provided outside the rotary machine system 1. Therefore, the rotary machine system 1 may not have the oil tank 6.

(Configuration of Lubricating Oil Supply Line)

The lubricating oil supply line 7 is a pipe through which a lubricating oil is supplied from a lubricating oil supply destination to the electric motor bearing 22, the compressor bearing 32, and the transmission 4. The lubricating oil supply line 7 includes a main supply line 70, a first supply line 71, a second supply line 72, and a third supply line 73.

One end of the main supply line 70 is connected to the oil tank 6. The first supply line 71, the second supply line 72, and the third supply line 73 are connected to the main supply line 70. A pump 75 is disposed on the main supply line 70. The pump 75 sends a lubricating oil in the oil tank 6 to the first supply line 71, the second supply line 72, and the third supply line 73.

A lubricating oil is supplied to the electric motor bearing 22 through the first supply line 71. The first supply line 71 includes a first supply line on one end side 71A and a first supply line on the other end side 71B. The first supply line on one end side 71A connects the main supply line 70 and the first electric motor bearing 22A to each other. The first supply line on the other end side 71B connects the main supply line 70 and the second electric motor bearing 22B to each other. The lubricating oil supplied through the first supply line 71 (the first supply line on one end side 71A and the first supply line on the other end side 71B) is used in lubricating the electric motor bearing 22 (the first electric motor bearing 22A and the second electric motor bearing 22B).

A lubricating oil is supplied to the compressor bearing 32 through the second supply line 72. The second supply line 72 includes a second supply line on one end side 72A and a second supply line on the other end side 72B. The second supply line on one end side 72A connects the main supply line 70 and the first compressor bearing 32A to each other. The second supply line on the other end side 72B connects the main supply line 70 and the second compressor bearing 32B to each other. The lubricating oil supplied through the second supply line 72 (the second supply line on one end side 72A and the second supply line on the other end side 72B) is used in lubricating the compressor bearing 32 (the first compressor bearing 32A and the second compressor bearing 32B). The flow rate of the lubricating oil supplied to each of the first compressor bearing 32A and the second compressor bearing 32B through each of the second supply line on one end side 72A and the second supply line on the other end side 72B is higher than the flow rate of the lubricating oil supplied to each of the first electric motor bearing 22A and the second electric motor bearing 22B through each of the first supply line on one end side 71A and the first supply line on the other end side 71B. For example, the flow rate of the lubricating oil supplied to the compressor bearing 32 through the second supply line 72 is approximately several to several tens of times the flow rate of the lubricating oil supplied to the electric motor bearing 22 through the first supply line 71.

A lubricating oil is supplied to the transmission 4 through the third supply line 73. The third supply line 73 connects the main supply line 70 and an inside of a casing 48 of the transmission 4. The lubricating oil supplied through the third supply line 73 is used in lubricating the gears 43 and 44 in the casing 48. In the present embodiment, the flow rate of the lubricating oil supplied to the transmission 4 through the third supply line 73 is higher than the flow rate of the lubricating oil supplied to each of the first electric motor bearing 22A and the second electric motor bearing 22B through each of the first supply line on one end side 71A and the first supply line on the other end side 71B. For example, the flow rate of the lubricating oil supplied to the transmission 4 through the third supply line 73 is approximately several to several tens of times the flow rate of the lubricating oil supplied to the electric motor bearing 22 through the first supply line 71.

(Configuration of Lubricating Oil Discharge Line)

The lubricating oil discharge line 8 is a pipe through which a lubricating oil discharged from the electric motor bearing 22, the compressor bearing 32, and the transmission 4 is sent to the discharge destination. The lubricating oil discharge line 8 includes a first discharge line 81, a second discharge line 82, a third discharge line 83, and a lower discharge line 85.

A lubricating oil is discharged from the electric motor bearing 22 through the first discharge line 81. The first discharge line 81 includes a first discharge line on one end side 81A and a first discharge line on the other end side 81B. An upper end of the first discharge line on one end side 81A is connected to the first electric motor bearing 22A. The first discharge line on one end side 81A extends from the first electric motor bearing 22A downward in a vertical direction Dv. An upper end of the first discharge line on the other end side 81B is connected to the second electric motor bearing 22B. The first discharge line on the other end side 81B extends from the second electric motor bearing 22B downward in the vertical direction Dv. The lubricating oil used and discharged from the electric motor bearing 22 (the first electric motor bearing 22A and the second electric motor bearing 22B) is discharged to the lower discharge line 85 below through the first discharge line 81 (the first discharge line on one end side 81A and the first discharge line on the other end side 81B).

A lubricating oil is discharged from the compressor bearing 32 through the second discharge line 82. The second discharge line 82 includes a second discharge line on one end side 82A and a second discharge line on the other end side 82B. An upper end of the second discharge line on one end side 82A is connected to the first compressor bearing 32A. The second discharge line on one end side 82A extends from the first compressor bearing 32A downward in the vertical direction Dv. An upper end of the second discharge line on the other end side 82B is connected to the second compressor bearing 32B. The second discharge line on the other end side 82B extends from the second compressor bearing 32B downward in the vertical direction Dv. The lubricating oil used and discharged from the compressor bearing 32 (the first compressor bearing 32A and the second compressor bearing 32B) is discharged to the lower discharge line 85 which is disposed below the compressor bearing 32 through the second discharge line 82 (the second discharge line on one end side 82A and the second discharge line on the other end side 82B).

A lubricating oil is discharged from the transmission 4 through the third discharge line 83. An upper end of the third discharge line 83 is connected to a lower portion of the casing 48 of the transmission 4. The third discharge line 83 extends from the lower portion of the casing 48 of the transmission 4 downward in the vertical direction Dv. The lubricating oil used and discharged from the transmission 4 is discharged to the lower discharge line 85 below through the third discharge line 83.

(Configuration of Lower Discharge Line)

The lower discharge line 85 is disposed below the first discharge line 81, the second discharge line 82, and the third discharge line 83. A lubricating oil discharged from the first discharge line 81, the second discharge line 82, and the third discharge line 83 flows through the lower discharge line 85 toward the oil tank which is a discharge destination. The lower discharge line 85 extends from the second discharge line 82 toward the oil tank 6. The lower discharge line 85 is a pipe extending in a linear shape from a base end portion 85a, which is one end in the axial direction Da, toward a tip portion 85b, which is the other end. The lower discharge line 85 is inclined to descend obliquely downward from the base end portion 85a on a second discharge line 82 side toward the tip portion 85b on an oil tank 6 side. The lower discharge line 85 is inclined obliquely downward, for example, at a gradient of approximately ¹⁄₂₅ from the base end portion 85a toward the tip portion 85b.

The tip portion 85b of the lower discharge line 85 is connected to the oil tank 6. Each of a lower end of the first discharge line 81 (the first discharge line on one end side 81A and the first discharge line on the other end side 81B), a lower end of the second discharge line 82 (the second discharge line on one end side 82A and the second discharge line on the other end side 82B), and a lower end of the third discharge line 83 is connected to the lower discharge line 85. Specifically, the lower discharge line 85 has a first connecting portion 91 connected to the lower end of the first discharge line 81, a second connecting portion 92 connected to the lower end of the second discharge line 82, and a third connecting portion 93 connected to the lower end of the third discharge line 83.

The first connecting portion 91 has a first connecting portion on one end side 91A connected to the first discharge line on one end side 81A and a first connecting portion on the other end side 91B connected to the first discharge line on the other end side 81B. Among the first connecting portion 91, the second connecting portion 92, and the third connecting portion 93, the first connecting portion on one end side 91A is disposed at a position closest to the oil tank 6. The first connecting portion on the other end side 91B is disposed at a position closer to the base end portion 85a than the first connecting portion on one end side 91A is.

The second connecting portion 92 has a second connecting portion on one end side 92A connected to the second discharge line on one end side 82A and a second connecting portion on the other end side 92B connected to the second discharge line on the other end side 82B. The second connecting portion on one end side 92A is disposed at a position closer to the base end portion 85a than the first connecting portion on the other end side 91B is. The second connecting portion on the other end side 92B is the base end portion 85a. That is, among the first connecting portion 91, the second connecting portion 92, and the third connecting portion 93, the second connecting portion on the other end side 92B is disposed at a position farthest from the oil tank 6.

The third connecting portion 93 is disposed between the first connecting portion on the other end side 91B and the second connecting portion on one end side 92A. Therefore, the lower discharge line 85 of the present embodiment extends such that a lubricating oil goes through the third connecting portion 93 from the first connecting portion on the other end side 91B, and then heads for the oil tank 6 through the first connecting portion on one end side 91A.

In such a rotary machine system 1, a lubricating oil discharged from the electric motor bearing 22, the compressor bearing 32, and the transmission 4 is discharged to the lower discharge line 85 below through each of the first discharge line 81, the second discharge line 82, and the third discharge line 83. The lubricating oil discharged into the lower discharge line 85 flows from the base end portion 85a, which is an upstream side due to the gradient of the lower discharge line 85, toward the tip portion 85b, which is a downstream side.

Figure 2:
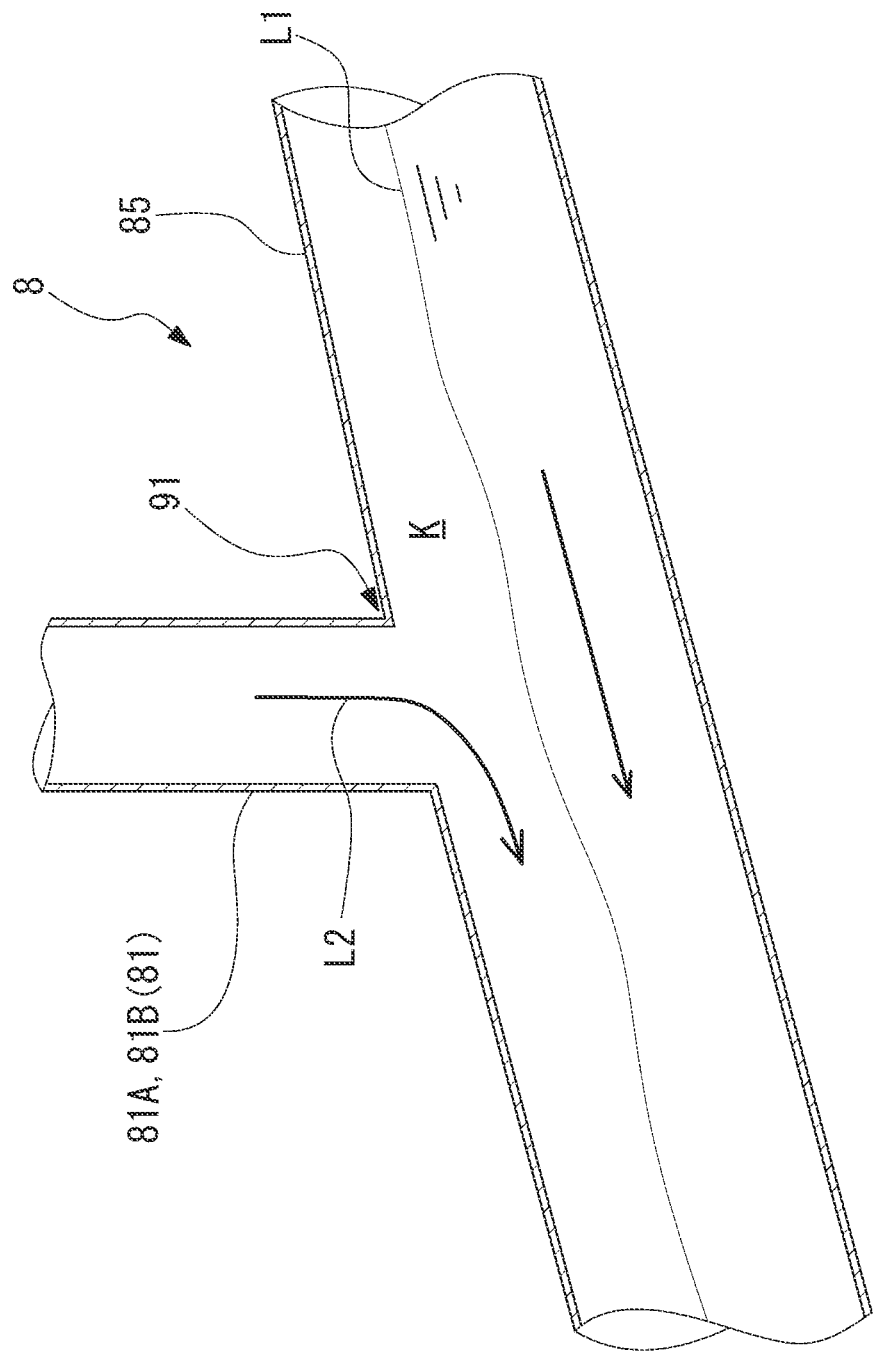
FIG. 2 is a sectional view illustrating a connecting portion between a first discharge line and a lower discharge line of the rotary machine system.

As illustrated in FIG. 2, at the first connecting portion 91, a lubricating oil L1 discharged from the second discharge line 82 and the third discharge line 83 has already flowed in the lower discharge line 85 toward the oil tank 6. Herein, at the first connecting portion 91, the lubricating oil L1 discharged from the second discharge line 82 and the third discharge line 83 flows in a lower layer portion in the lower discharge line 85, and in an upper layer portion thereof, a gas layer K is formed. Also the gas layer K has flowed toward the oil tank 6 following the lubricating oil L1 toward the oil tank 6 in the lower discharge line 85. In addition, the amount of the lubricating oil L1 discharged from the second discharge line 82 and the third discharge line 83 is extremely larger than the amount of a lubricating oil L2 discharged from the first discharge line 81. For this reason, due to the flow of the gas layer K, the lubricating oil L2 in the first discharge line 81 is drawn into the lower discharge line 85. As a result, the pressure of a gas, such as air, in the first discharge line 81 becomes a negative pressure which is lower than the atmospheric pressure.

Herein, a pressure P of the gas in the first discharge line 81 is preferably $0 > P > -1{,}000$ [Pa]. A more preferable range of the pressure P of the gas in the first discharge line 81 is $-5 > P > -300$ [Pa]. A particularly preferable range of the pressure P of the gas in the first discharge line 81 is $-50 > P > -200$ [Pa].

In this manner, the lubricating oil L1 discharged at the first connecting portion 91 from the first discharge line 81 to the lower discharge line 85 is drawn into the lower discharge line 85 and is discharged to the oil tank 6.

(Operational Effects)

In the rotary machine system 1 of the configuration, a lubricating oil, which has flowed through the first discharge line 81, the second discharge line 82, and the third discharge line 83, flows in the lower discharge line 85 toward the oil tank 6. At the first connecting portion 91, which is a connecting portion between the first discharge line 81 and the lower discharge line 85, the lubricating oil L1 discharged from the second discharge line 82 and the third discharge line 83 flows in the lower discharge line 85 toward the oil tank 6. Due to the flow of the lubricating oil L1 discharged from the second discharge line 82 and the third discharge line 83, a flow drawing from the first discharge line 81 into the lower discharge line 85 is generated at the first connecting portion 91. For this reason, the lubricating oil in the first discharge line 81 is drawn into the lower discharge line 85.

As a result, a flow heading for the lower discharge line 85 is generated in the first discharge line 81. Accordingly, the lubricating oil is smoothly discharged from the electric motor bearing 22 to the first discharge line 81, suppressing that the lubricating oil stays in the electric motor bearing 22. In a case where the electric motor 2, the transmission 4, and the compressor 3 are disposed in parallel as in the present embodiment, the leakage of the lubricating oil occurs in some cases at a bearing of a part of the machine having a relatively low sealing property such as the electric motor 2 having a low sealing property around the bearing compared to the compressor 3 and the transmission 4. However, with such a configuration, the occurrence of leakage of the lubricating oil in the electric motor bearing 22 can be suppressed simply with the layout of the lower discharge line 85 without using any additional device. Therefore, it is possible to suppress the occurrence of leakage of the lubricating oil in the electric motor bearing 22 while suppressing a cost increase.

In addition, the lower discharge line 85 is formed in a linear shape and is inclined to descend from the base end portion 85a toward the oil tank 6 via the first connecting portion 91. For this reason, without performing a mounting operation such as complicated pipe routing, the lubricating oil L1 discharged from the second discharge line 82 at the first connecting portion 91 reliably flows in the lower discharge line 85 toward the first connecting portion 91. Accordingly, a flow drawing from the first discharge line 81 into the lower discharge line 85 occurs at the first connecting portion 91 with high accuracy. Therefore, it is possible to more reliably suppress the occurrence of leakage of the lubricating oil in the electric motor bearing 22.

In addition, as the rotary machine system 1 includes the oil tank 6, a lubricating oil discharged from the lower discharge line 85 is collected at the oil tank 6 and can be supplied again to the electric motor 2, the transmission 4, and the compressor 3.

Another Embodiment

While preferred embodiments of the invention have been described and illustrated above, it should be understood that these are exemplary of the invention and are not to be considered as limiting. Additions, omissions, substitutions, and other modifications can be made without departing from the scope of the invention.

Accordingly, the invention is not to be considered as being limited by the foregoing description and is only limited by the scope of the appended claims.

Although the rotary machine system 1 includes the electric motor 2, which is the rotary electric machine, and includes the compressor 3, which is the rotary machine, in the embodiment, the invention is not limited thereto. The rotary electric machine is not limited to being a driving device as in the present embodiment and may be a driven device. Similarly, the rotary machine is not limited to being the driven device as in the present embodiment and may be a driving device. Therefore, for example, the rotary machine system may include a steam turbine, which is a rotary machine, and include a generator, which is a rotary electric machine and generates electricity by being driven by the steam turbine.

In addition, although the lower discharge line 85 has a linear shape and is inclined obliquely downward from the base end portion 85a toward the tip portion 85b in the embodiment, the invention is not limited to such a configuration. It is sufficient that the lower discharge line 85 has a configuration where a lubricating oil can flow from the second connecting portion 92 toward the oil tank 6, which is a discharge destination, through the first connecting portion 91.

In addition, the lower discharge line 85 is not limited to the base end portion 85a being the second connecting portion on the other end side 92B. The lower discharge line 85 may extend beyond the second connecting portion on the other end side 92B to be connected to another pipe.

In addition, the lower discharge line 85 is not limited to having a linear shape as a whole. It is sufficient that the lower discharge line 85 is formed to have at least a linear shape between the first connecting portion on one end side 91A and the second connecting portion on the other end side 92B, which is to be described later.

In addition, the structure of the bearing included in the electric motor 2 or the compressor 3 is not limited to the structure of the present embodiment. For example, the electric motor bearing 22 and the first compressor bearing 32A may each have a thrust bearing.

APPENDIX

For example, the rotary machine system 1 of the embodiment is identified as follows.

(1) The rotary machine system 1 according to a first aspect includes the rotary electric bearing 22 that has the rotary electric rotor 211 and rotatably supports the rotary electric rotor 211, the rotary machine 3 that has the rotary machine main body 31, which has the rotary machine rotor 33 that is configured to rotate with the rotary electric rotor 211, and has the rotary machine bearing 32 which rotatably supports the rotary machine rotor 33, the first supply line 71 through which a lubricating oil is supplied to the rotary electric bearing 22, the second supply line 72 through which the lubricating oil is supplied to the rotary machine bearing 32 at a flow rate higher than that in the first supply line 71, the first discharge line 81 through which the lubricating oil is discharged downward from the rotary electric bearing 22, the second discharge line 82 through which the lubricating oil is discharged downward from the rotary machine bearing 32 at a flow rate higher than that in the first discharge line 81, and the lower discharge line 85 through which the lubricating oil discharged from the first discharge line 81 and the second discharge line 82 flows toward a discharge destination. The lower discharge line 85 has the first connecting portion 91 connected to the lower end of the first discharge line 81 and the second connecting portion 92 connected to the lower end of the second discharge line 82 and extends such that the lubricating oil heads for the discharge destination from the second connecting portion 92 through the first connecting portion 91.

Examples of the rotary machine include a compressor and a steam turbine. Examples of the rotary electric machine include an electric motor and a generator.

In the rotary machine system 1, a lubricating oil in the lower discharge line 85, which has flowed through the first discharge line 81 and the third discharge line 83, flows toward the discharge destination. At the first connecting portion 91, which is the connecting portion between the first discharge line 81 and the lower discharge line 85, the lubricating oil L1 discharged from the second discharge line 82 flows in the lower discharge line 85 toward the oil tank 6. Due to the flow of the lubricating oil L1 discharged from the second discharge line 82, a flow drawing from the first discharge line 81 into the lower discharge line 85 is generated at the first connecting portion 91. For this reason, the lubricating oil in the first discharge line 81 is drawn into the lower discharge line 85. As a result, a flow heading for the lower discharge line 85 is generated in the first discharge line 81. Accordingly, the lubricating oil is smoothly discharged from the rotary electric bearing 22 to the first discharge line 81, such that the lubricating oil stays in the rotary electric bearing 22. With such a configuration, the occurrence of leakage of the lubricating oil in the rotary electric bearing 22 can be suppressed simply by way of the layout of the lower discharge line 85 without using any additional devices. Therefore, it is possible to suppress the occurrence of leakage of the lubricating oil in the rotary electric bearing 22 while suppressing a cost increase.

(2) The rotary machine system 1 according to a second aspect is the rotary machine system 1 of (1), in which the lower discharge line 85 may be formed in a linear shape between the first connecting portion 91 and the second connecting portion 92 and may be inclined to descend from the second connecting portion 92 toward the discharge destination.

Accordingly, the lubricating oil L1 discharged from the second discharge line 82 at the first connecting portion 91 reliably flows in the lower discharge line 85 toward the first connecting portion 91. Therefore, a flow drawing from the first discharge line 81 into the lower discharge line 85 occurs at the first connecting portion 91 with high accuracy. Accordingly, it is possible to more reliably suppress the occurrence of leakage of the lubricating oil in the rotary electric bearing 22.

(3) The rotary machine system 1 according to a third aspect is the rotary machine system 1 of (1) or (2) and may include the transmission 4 disposed between the rotary electric machine 2 and the rotary machine 3, the third supply line 73 through which the lubricating oil is supplied to the transmission 4, and the third discharge line 83 through which the lubricating oil is discharged downward from the transmission 4. The lower end of the third discharge line 83 may be connected to the lower discharge line 85 between the first connecting portion 91 and the second connecting portion 92.

Accordingly, the lubricating oil discharged from the transmission 4 flows from the second discharge line 82 side with respect to the first discharge line 81 toward the lower discharge line 85 through the third discharge line 83. Therefore, not only the lubricating oil discharged from the rotary machine bearing 32, but also the lubricating oil discharged from the transmission 4 flows in the lower discharge line 85 at the first connecting portion 91. Therefore, the amount of the lubricating oil flowing in the lower discharge line 85 can be increased at the first connecting portion 91. As a result, a force drawing the lubricating oil from the first discharge line 81 into the lower discharge line 85 can be made strong. Accordingly, the lubricating oil is more smoothly discharged from the rotary electric bearing 22, and the occurrence of leakage of the lubricating oil in the rotary electric bearing 22 can be more reliably suppressed.

(4) The rotary machine system 1 according to a fourth aspect is the rotary machine system 1 of any one of (1) to (3), in which the pressure of the gas in the first discharge line 81 may be a negative pressure.

(5) The rotary machine system 1 according to a fifth aspect is the rotary machine system 1 of any one of (1) to (4), and may further include the oil tank 6 storing the lubricating oil, which is the discharge destination. The lubricating oil may be supplied from the oil tank through the first supply line 71 and the second supply line 72.

Accordingly, the lubricating oil discharged from the lower discharge line 85 can be collected at the oil tank 6, and can be supplied again.

(6) The rotary machine system 1 according to a sixth aspect is the rotary machine system 1 of any one of (1) to (5), in which the rotary machine 3 is a compressor, and the rotary electric machine 2 is a motor that rotationally drives the compressor.

Accordingly, in the rotary machine system 1 including the compressor and the motor, it is possible to suppress the occurrence of leakage of the lubricating oil in the rotary electric bearing 22 while suppressing a cost increase.

EXPLANATION OF REFERENCES

- 1 rotary machine system
- 2 electric motor (rotary electric machine)
- 3 compressor (rotary machine)
- 4 transmission
- 6 oil tank
- 7 lubricating oil supply line
- 8 lubricating oil discharge line
- 21 electric motor main body (rotary electric main body)
- 211 electric motor rotor (rotary electric rotor)
- 22 electric motor bearing (rotary electric bearing)
- 22A first electric motor bearing
- 22B second electric motor bearing
- 23 output shaft
- 31 compressor main body (rotary machine main body)
- 32 compressor bearing (rotary machine bearing)
- 32A first compressor bearing
- 32B second compressor bearing
- 33 rotor (rotary machine rotor)
- 41 transmission input shaft
- 42 transmission output shaft
- 43, 44 gear
- 48 casing
- 70 main supply line
- 71 first supply line
- 71A first supply line on one end side
- 71B first supply line on the other end side
- 72 second supply line
- 72A second supply line on one end side
- 72B second supply line on the other end side
- 73 third supply line
- 75 pump
- 81 first discharge line
- 81A first discharge line on one end side
- 81B first discharge line on the other end side
- 82 second discharge line
- 82A second discharge line on one end side
- 82B second discharge line on the other end side
- 83 third discharge line
- 85 lower discharge line
- 85a base end portion
- 85b tip portion
- 91 first connecting portion
- 91A first connecting portion on one end side
- 91B first connecting portion on the other end side
- 92 second connecting portion
- 92A second connecting portion on one end side
- 92B second connecting portion on the other end side
- 93 third connecting portion
- C1 first axis
- C2 second axis
- Da axial direction
- Dv vertical direction
- K gas layer
- L1, L2 lubricating oil
- P pressure

What is claimed is:

1. A rotary machine system comprising:
    a rotary electric machine that has a rotary electric rotor and has a rotary electric bearing rotatably supporting the rotary electric rotor;
    a rotary machine that has a rotary machine rotor that is configured to rotate with the rotary electric rotor and has a rotary machine bearing rotatably supporting the rotary machine rotor;
    a first supply line through which a lubricating oil is supplied to the rotary electric bearing;
    a second supply line through which the lubricating oil is supplied to the rotary machine bearing at a flow rate higher than that in the first supply line;
    a first discharge line through which the lubricating oil is discharged downward from the rotary electric bearing;
    a second discharge line through which the lubricating oil is discharged downward from the rotary machine bearing at a flow rate higher than that in the first discharge line; and
    a lower discharge line through which the lubricating oil discharged from the first discharge line and the second discharge line flows toward a discharge destination,
    wherein the lower discharge line has a first connecting portion connected to a lower end of the first discharge line and a second connecting portion connected to a lower end of the second discharge line, and extends such that the lubricating oil heads for the discharge destination through the first connecting portion from the second connecting portion.

2. The rotary machine system according to claim 1,
    wherein the lower discharge line is formed in a linear shape between the first connecting portion and the second connecting portion and is inclined to descend from the second connecting portion toward the discharge destination.

3. The rotary machine system according to claim 1, further comprising:
    a transmission disposed between the rotary electric machine and the rotary machine;
    a third supply line through which the lubricating oil is supplied to the transmission; and
    a third discharge line through which the lubricating oil is discharged downward from the transmission,
    wherein a lower end of the third discharge line is connected to the lower discharge line between the first connecting portion and the second connecting portion.

4. The rotary machine system according to claim 1,
    wherein a pressure of a gas in the first discharge line is a negative pressure.

5. The rotary machine system according to claim 1, further comprising:
    an oil tank that stores the lubricating oil and is the discharge destination,
    wherein the lubricating oil is supplied from the oil tank through the first supply line and the second supply line.

6. The rotary machine system according to claim 1,
    wherein the rotary machine is a compressor, and the rotary electric machine is a motor that rotationally drives the compressor.

* * * * *